(12) United States Patent
Jiang et al.

(10) Patent No.: US 9,374,762 B2
(45) Date of Patent: Jun. 21, 2016

(54) ELECTRONIC DEVICE AND WIRELESS COMMUNICATION METHOD UTILIZING GEOLOCATION SERVICE PROVIDER

(71) Applicant: Acer Incorporated, New Taipei (TW)

(72) Inventors: Shu-Yu Jiang, New Taipei (TW); Yung-Sen Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 124 days.

(21) Appl. No.: 14/254,181

(22) Filed: Apr. 16, 2014

(65) Prior Publication Data
US 2015/0117330 A1    Apr. 30, 2015

(30) Foreign Application Priority Data
Oct. 31, 2013 (TW) .............................. 102139479 A

(51) Int. Cl.
*H04W 40/20* (2009.01)
(52) U.S. Cl.
CPC .................................... *H04W 40/20* (2013.01)
(58) Field of Classification Search
None
See application file for complete search history.

(56) References Cited

U.S. PATENT DOCUMENTS

| | | | |
|---|---|---|---|
| 2011/0116453 A1* | 5/2011 | Huang | H04W 48/18 370/329 |
| 2011/0176523 A1* | 7/2011 | Huang | G01S 5/02 370/338 |
| 2012/0052876 A1 | 3/2012 | Anderson et al. | |
| 2012/0184318 A1* | 7/2012 | Lee | H04W 16/14 455/515 |
| 2013/0051353 A1* | 2/2013 | Kim | H04W 16/14 370/329 |
| 2013/0252640 A1 | 9/2013 | Kenney et al. | |
| 2013/0303232 A1* | 11/2013 | Thomas | H04W 52/146 455/550.1 |
| 2015/0071268 A1* | 3/2015 | Kennedy | H04W 8/08 370/338 |

FOREIGN PATENT DOCUMENTS

WO  WO 2012/092680    7/2012

OTHER PUBLICATIONS

Taiwanese language office action dated Apr. 16, 2015=5, issued in application No. TW 102139479.

* cited by examiner

*Primary Examiner* — Brian Roberts
(74) *Attorney, Agent, or Firm* — McClure, Qualey & Rodack, LLP

(57) ABSTRACT

The present invention provides an electronic device including an internet module. The internet module includes a microprocessor and a memory. The memory stores a predetermined regulatory domain and a predetermined communication channel corresponding to the predetermined regulatory domain. The microprocessor connects to a geolocation service provider through the internet, obtains location information from the geolocation service provider, obtains a detection regulatory domain according to the location information, and provides a detection communication channel corresponding to the detection regulatory domain.

10 Claims, 3 Drawing Sheets

1

ELECTRONIC DEVICE AND WIRELESS COMMUNICATION METHOD UTILIZING GEOLOCATION SERVICE PROVIDER

CROSS REFERENCE TO RELATED APPLICATIONS

This application claims priority of Taiwan Patent Application No. 102139479, filed on Oct. 31, 2013, the entirety of which is incorporated by reference herein.

BACKGROUND OF THE INVENTION

1. Field of the Invention

The present invention relates to an electronic device and a wireless communication method, and in particular to a wireless communication method of obtaining location information from a geolocation service provider to adjust the regulatory domain.

2. Description of the Related Art

Wireless communication has been widely used in all kinds of electronic devices, such as cell phone, notebook computer and television. Generally, using the communication protocol of IEEE 802.11d, an electronic device obtains a regulatory domain or a country code from an access point (AP) and selects proper communication channels for wireless communication. However, if the regulatory domain or the country code provided by the AP is not correct, the electronic device cannot communicate effectively. Therefore, an electronic device and a communication method of detection regulatory domains to select the best communication method are needed.

BRIEF SUMMARY OF THE INVENTION

The present invention provides an electronic device including an internet module. The internet module includes a microprocessor and a memory. The microprocessor is utilized to perform network connections with a geolocation service provider, obtain location information from the geolocation service provider, obtain a detection regulatory domain according to the location information and provide a detection communication channel corresponding to the detection regulatory domain. The memory is utilized to store a predetermined regulatory domain and a predetermined communication channel corresponding to the predetermined regulatory domain.

The present invention provides a wireless communication method applied to an electronic device. The electronic device includes a memory storing a predetermined regulatory domain and a predetermined communication channel corresponding to the predetermined regulatory domain. The wireless communication method includes performing network connections with a geolocation service provider by a microprocessor; obtaining location information from the geolocation service provider by the microprocessor; obtaining a detection regulatory domain according to the location information by the microprocessor; and providing a detection communication channel corresponding to the detection regulatory domain by the microprocessor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
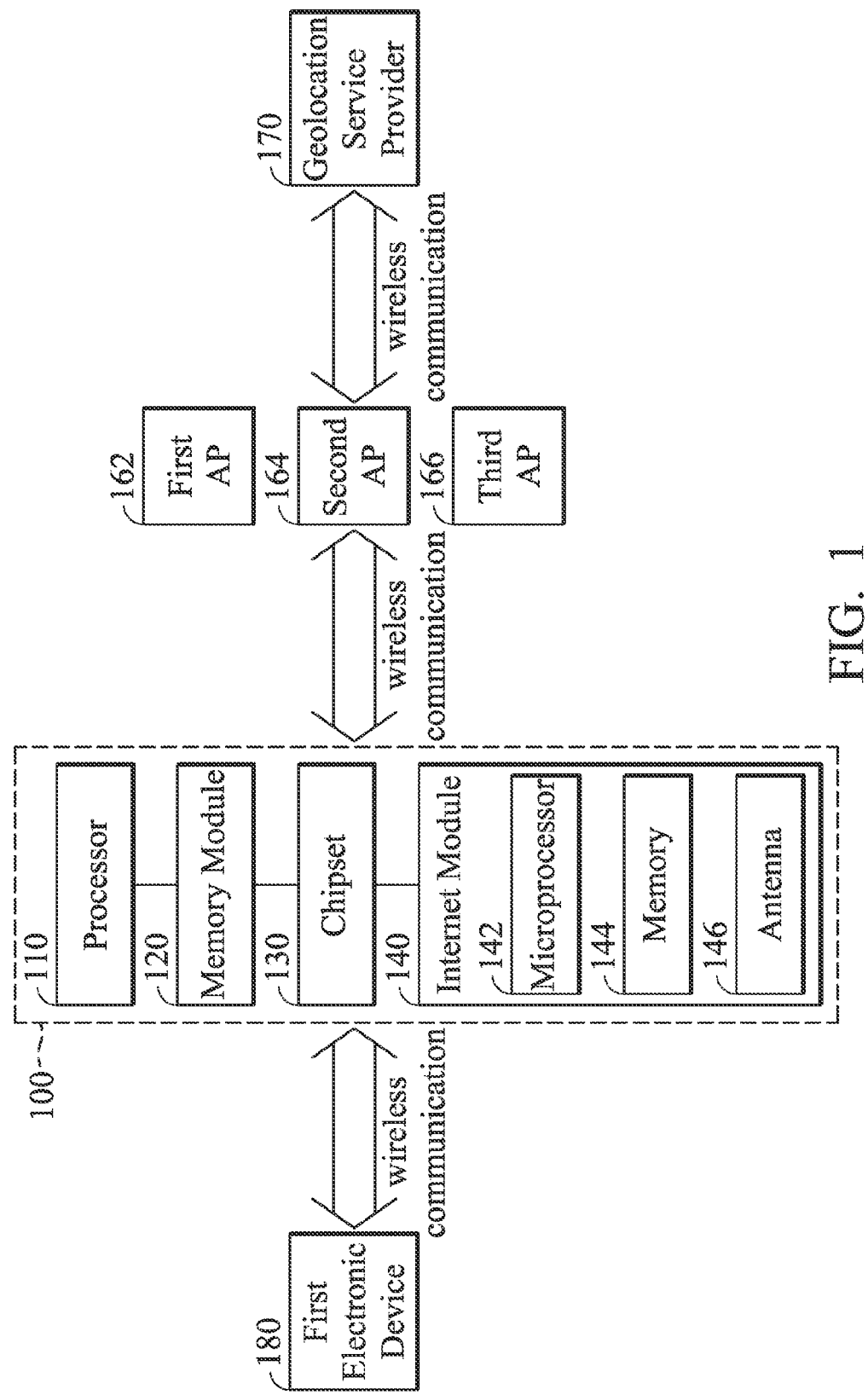
FIG. 1 is a schematic diagram of an electronic device of the present invention.

FIG. 1 is a schematic diagram of an electronic device of the present invention. As shown in FIG. 1, the electronic device 100 includes a processor 110, a memory module 120, a chipset 130 and an internet module 140. For example, the electronic device 100 could be a laptop computer, a tablet computer, a cell-phone, a television, a projector, a monitor and/or the electronic device with the function of wireless communication. The internet module 140 transmits data based on the protocol of wireless communication. For example, the protocol of wireless communication could constitute GSM, GPRS, EDGE, UMTS, W-CDMA, TD-CDMA, Bluetooth, NFC, WiFi, WiMAX, LTE, LTE-A or TD-LTE. In some embodiments, the internet module 140 is based on the WiFi communication protocol, especially the WiFi Direct communication protocol. In an embodiment, the internet module 140 includes a microprocessor 142, a memory 144 and an antenna 146. In addition, the processor 110 and the microprocessor 142 can include a digital signal processor (DSP), a microcontroller (MCU), a central-processing unit (CPU) or a plurality of parallel processors relating the parallel processing environment to implement the operating system (OS), firmware, driver and/or other applications of the electronic device 100.

In one embodiment, the microprocessor 142 performs network connections with the geolocation service provider 170 through one of the first AP 162, the second AP 164 and the third AP 166, obtains location information from the geolocation service provider 170 and obtains the detection regulatory domain from the AP corresponding to the location information. Afterwards, the microprocessor 142 provides the detection communication channel corresponding to the detection regulatory domain. For example, the geolocation service provider 170 is a server of a web or a website, such as the server of Yahoo or Google. In some embodiments, the first AP 162, the second AP 164 and the third AP 166 have different predetermined regulatory domains and/or country codes. For example, the country code of the first AP 162 is Japan, the country code of the second AP 164 is China, and the country code of the third AP 166 is Taiwan. When the microprocessor 142 implements network connections with the geolocation service provider 170 and obtains the location information of the current position of the electronic device 100, it will obtain the detection regulatory domain and the country code of the current geolocation of the electronic device 100. In some embodiments, the microprocessor 142 implements network connections with the geolocation service provider 170 in the same way as the internet module 140 implements network connections with the geolocation service provider 170.

Regarding the effect, when the electronic device 100 communicates wirelessly with the surrounding first electronic device 180 utilizing the predetermined regulatory domain the predetermined country code, it might not comply with the regulatory domain and/or the country code of the current position of the first electronic device 180 and cannot perform wireless communication effectively. Because the geolocation of the electronic device 100 is the same as the geolocation of the first electronic device 180, when the electronic device 100 obtains the detection regulatory domain and the country code of the current geolocation according to the location information, it will comply with the regulatory domain and/or the country code of the first electronic device 180 and perform the wireless communication effectively. In one embodiment, the first electronic device 180 can be a laptop computer, a tablet computer, a cell-phone, a television, a projector, a monitor and/or the electronic device with the function of wireless communication.

It should be noted that when the microprocessor 142 obtains the location information of the current geolocation, it will set the firmware stored in the memory 144 according to the location information. Afterwards, the firmware obtains the detection regulatory domain through the driver. In some embodiments, the predetermined regulatory domain of the electronic device 100 is stored on the memory 144, and the driver updates the predetermined regulatory domain to the detection regulatory domain according to the location information. In addition, the memory 144 further stores a predetermined communication channel corresponding to the predetermined regulatory domain. In one embodiment, the communication frequency of the predetermined communication channel is about 2.4 GHz, and the communication frequency of the detection communication channel is about 5 GHz. In another embodiment, the detection communication channel is utilized to perform wireless communications of the wireless display standard of Miracast and WiFi Direct. It should be noted that the electronic device 100 and the first electronic device 180 can both perform peer-to-peer wireless communications through the predetermined communication channel or the detection communication channel. In another embodiment, the predetermined country code of the electronic device 100 is stored in the memory 144, and the driver updates the predetermined country code to the detection country code according to the location information. In addition, after the internet module 140 obtains the detection regulatory domain, it provides the detection communication channel corresponding to the detection regulatory domain. Afterwards, the antenna 146 performs wireless communications with the first electronic device 180 according to the detection communication channel.

Figure 2:
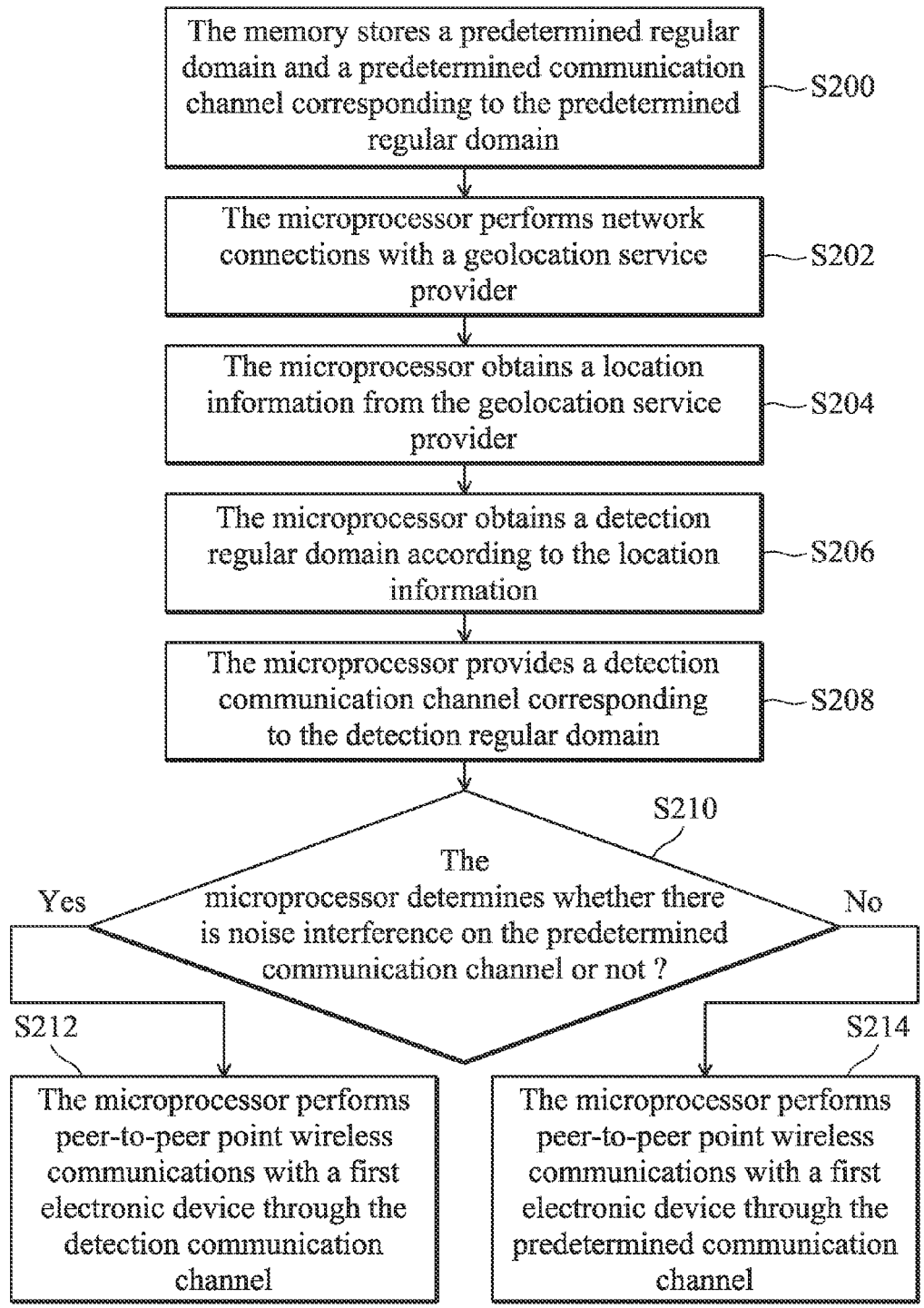
FIG. 2 is a flowchart of the wireless communication method of the present invention.

FIG. 2 is a flowchart of the wireless communication method of the present invention. In step S200, the memory 1444 stores a predetermined regulatory domain and a predetermined communication channel corresponding to the predetermined regulatory domain. In step S202, the microprocessor 142 performs network connections with a geolocation service provider 170. Afterwards, as stated in step S204, the microprocessor 142 obtains location information of the current location of the electronic device 100 from the geolocation service provider 170. Afterwards, in step 206, the microprocessor 142 obtains a detection regulatory domain according to the location information. In step S208, the microprocessor 142 provides a detection communication channel corresponding to the detection regulatory domain. Afterwards, in step S210, the microprocessor 142 determines whether there is noise interference on the predetermined communication channel or not. If there is noise interference on the predetermined communication channel, step S212 is implemented and the microprocessor 142 performs peer-to-peer wireless communications with a first electronic device 180 through the detection communication channel. If there is no noise interference on the predetermined communication channel, step S214 is implemented and the microprocessor 142 performs peer-to-peer wireless communications with a first electronic device 180 through the predetermined communication channel. Therefore, if there is noise interference on the predetermined communication channel, the electronic device 100 can obtain the detection communication channel rather than the predetermined communication channel through the location information provided by the geolocation service provider 170 and perform peer-to-peer wireless communications.

Figure 3:
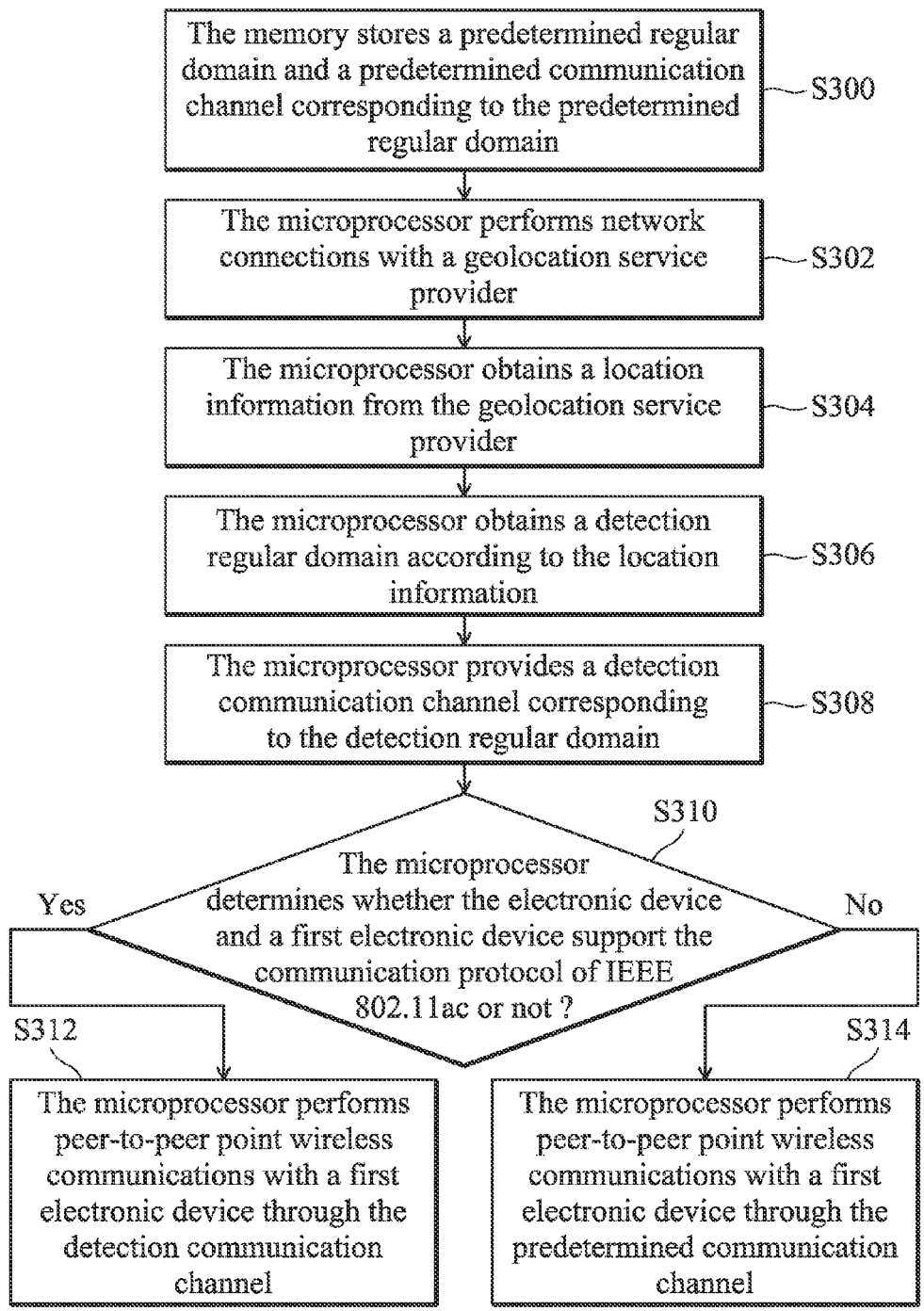
FIG. 3 is a flowchart of another wireless communication method of the present invention.

FIG. 3 is a flowchart of another wireless communication method of the present invention. Steps S300 to S308 are the same as the steps S200 to S208, and will not be described again. It should be noted that in step S310, the microprocessor 142 determines whether the electronic device 100 and the first electronic device 180 support the communication protocol of IEEE 802.11 ac or not. If the electronic device 100 and a first electronic device 180 support the communication protocol of IEEE 802.11ac, step S312 is implemented and the microprocessor 142 performs peer-to-peer wireless communications with a first electronic device 180 through the detection communication channel. If the electronic device 100 and a first electronic device 180 do not support the communication protocol of IEEE 802.11ac, step S314 is implemented and the microprocessor 142 performs peer-to-peer wireless communications with a first electronic device 180 through the predetermined communication channel. Since there are wider bandwidths and faster transmission speeds with the communication protocol of IEEE 802.11 ac, the electronic device 100 can perform peer-to-peer wireless communications through the obtained detection communication channel.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising
   an internet module, including
     a microprocessor, utilized to perform network connections with a geolocation service provider, obtain location information from the geolocation service provider, obtain a detection regulatory domain according to the location information and provide a detection communication channel corresponding to the detection regulatory domain; and
   a memory, utilized to store a predetermined regulatory domain and a predetermined communication channel corresponding to the predetermined regulatory domain, wherein the microprocessor determines whether there is noise interference on the predetermined communication channel or not, performs peer-to-peer wireless communications with a first electronic device through the detection communication channel if there is noise interference on the predetermined communication channel, and performs peer-to-peer wireless communications with a first electronic device through the predetermined communication channel if there is no noise interference on the predetermined communication channel.

2. The electronic device as claimed in claim 1, wherein the microprocessor updates the predetermined regulatory domain to the detection regulatory domain according to the location information.

3. The electronic device as claimed in claim 1, wherein the communication frequency of the predetermined communication channel is about 2.4 GHz, and the communication frequency of the detection communication channel is about 5 GHz.

4. The electronic device as claimed in claim 1, wherein the microprocessor performs network connections with the geolocation service provider through at least one access point and obtains the detection regulatory domain on the access point corresponding to the location information.

5. An electronic device, comprising
an internet module, including
a microprocessor, utilized to perform network connections with a geolocation service provider, obtain location information from the geolocation service provider, obtain a detection regulatory domain according to the location information and provide a detection communication channel corresponding to the detection regulatory domain; and
a memory, utilized to store a predetermined regulatory domain and a predetermined communication channel corresponding to the predetermined regulatory domain, wherein the microprocessor further determines whether the electronic device and a first electronic device support the communication protocol of IEEE 802.11ac or not, performs peer-to-peer wireless communications with a first electronic device through the detection communication channel if the electronic device and a first electronic device support the communication protocol of IEEE 802.11ac, and performs peer-to-peer wireless communications with a first electronic device through the predetermined communication channel if the electronic device and a first electronic device do not support the communication protocol of IEEE 802.11ac.

6. A wireless communication method, applied to an electronic device, wherein the electronic device includes a memory storing a predetermined regulatory domain and a predetermined communication channel corresponding to the predetermined regulatory domain, comprising
performing network connections with a geolocation service provider by a microprocessor;
obtaining a location information from the geolocation service provider by the microprocessor;
obtaining a detection regulatory domain according to the location information by the microprocessor;
providing a detection communication channel corresponding to the detection regulatory domain by the microprocessor; and
determining whether there is noise interference on the predetermined communication channel or not by the microprocessor, performing peer-to-peer wireless communications with a first electronic device through the detection communication channel if there is noise interference on the predetermined communication channel, and performing peer-to-peer wireless communications with a first electronic device through the predetermined communication channel if there is no noise interference on the predetermined communication channel.

7. The wireless communication method as claimed in claim 6, wherein the step of obtaining the detection regulatory domain according to the location information comprises updating the predetermined regulatory domain to the detection regulatory domain according to the location information by the microprocessor.

8. The wireless communication method as claimed in claim 6, wherein the communication frequency of the predetermined communication channel is about 2.4 GHz, and the communication frequency of the detection communication channel is about 5 GHz.

9. The wireless communication method as claimed in claim 6, wherein the step of obtaining the detection regulatory domain according to the location information comprises performing network connections with the geolocation service provider through at least one access point and obtaining the detection regulatory domain on the access point corresponding to the location information by the microprocessor.

10. A wireless communication method, applied to an electronic device, wherein the electronic device includes a memory storing a predetermined regulatory domain and a predetermined communication channel corresponding to the predetermined regulatory domain, comprising
performing network connections with a geolocation service provider by a microprocessor;
obtaining a location information from the geolocation service provider by the microprocessor;
obtaining a detection regulatory domain according to the location information by the microprocessor;
providing a detection communication channel corresponding to the detection regulatory domain by the microprocessor; and
determining whether there is noise interference on the predetermined communication channel or not by the microprocessor, performing peer-to-peer wireless communications with a first electronic device through the detection communication channel if the electronic device and a first electronic device support the communication protocol of IEEE 802.11ac, and performing peer-to-peer wireless communications with a first electronic device through the predetermined communication channel if the electronic device and a first electronic device do not support the communication protocol of IEEE 802.11ac.

* * * * *